US008555386B1

(12) United States Patent
Belov

(10) Patent No.: US 8,555,386 B1
(45) Date of Patent: Oct. 8, 2013

(54) SYSTEM AND METHOD FOR COUNTERING DETECTION OF EMULATION BY MALWARE

(71) Applicant: Kaspersky Lab ZAO, Moscow (RU)

(72) Inventor: Sergey Y. Belov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/685,418

(22) Filed: Nov. 26, 2012

(30) Foreign Application Priority Data

Sep. 28, 2012 (RU) .................................. 2012141480

(51) Int. Cl.
*H04L 29/06* (2006.01)
(52) U.S. Cl.
USPC ........................................................... 726/22
(58) Field of Classification Search
USPC ........................................................... 726/22
See application file for complete search history.

(56) References Cited

U.S. PATENT DOCUMENTS

| 7,461,144 | B1 | 12/2008 | Beloussov et al. |
| 7,603,713 | B1 | 10/2009 | Belov |
| 7,607,171 | B1 * | 10/2009 | Marsden et al. ............... 726/24 |
| 7,689,747 | B2 | 3/2010 | Vega et al. |
| 7,877,802 | B2 | 1/2011 | Marinescu |
| 7,900,258 | B2 | 3/2011 | van der Made |
| 7,934,020 | B1 | 4/2011 | Xu et al. |
| 7,979,619 | B2 | 7/2011 | Barde et al. |
| 8,069,372 | B2 | 11/2011 | Natvig |
| 8,122,509 | B1 | 2/2012 | Belov |
| 8,132,167 | B2 | 3/2012 | Barde et al. |
| 8,145,871 | B2 | 3/2012 | Parfumi et al. |
| 8,151,263 | B1 | 4/2012 | Venkitachalam et al. |
| 8,151,352 | B1 | 4/2012 | Novitchi |
| 8,171,548 | B2 | 5/2012 | Mantripragada et al. |
| 2005/0187740 | A1 * | 8/2005 | Marinescu .................... 703/1 |
| 2008/0047023 | A1 | 2/2008 | Lam et al. |
| 2008/0234999 | A1 | 9/2008 | Cohen et al. |
| 2009/0044274 | A1 * | 2/2009 | Budko et al. .................. 726/24 |
| 2009/0055693 | A1 * | 2/2009 | Budko et al. .................. 714/57 |
| 2010/0107252 | A1 | 4/2010 | Mertoguno |
| 2011/0225655 | A1 | 9/2011 | Niemelae et al. |
| 2012/0096554 | A1 | 4/2012 | Stranne |
| 2012/0144484 | A1 | 6/2012 | Keromytis et al. |
| 2012/0151270 | A1 | 6/2012 | Stolfo et al. |
| 2012/0180132 | A1 | 7/2012 | Wu |

FOREIGN PATENT DOCUMENTS

WO    WO99/10795    3/1999

OTHER PUBLICATIONS

Kang et al., "Emulating Emulation-Resistant Malware", VMsec'09. Nov. 9, 2009. 12 pages.

* cited by examiner

*Primary Examiner* — Jason Gee
(74) *Attorney, Agent, or Firm* — Patterson Thuente Pedersen, P.A.

(57) ABSTRACT

Instructions of an application program are emulated such that they are carried out sequentially in a first virtual execution environment that represents the user-mode data processing of the operating system. A system API call requesting execution of a user-mode system function is detected. In response, the instructions of the user-mode system function called by the API are emulated according to a second emulation mode in which the instructions of the user-mode system function are carried out sequentially in a second virtual execution environment that represents the user-mode data processing of the operating system, including tracking certain processor and memory states affected by the instructions of the user-mode system function. Results of the emulating of the application program instructions according to the first emulation mode are analyzed for any presence of malicious code.

22 Claims, 9 Drawing Sheets

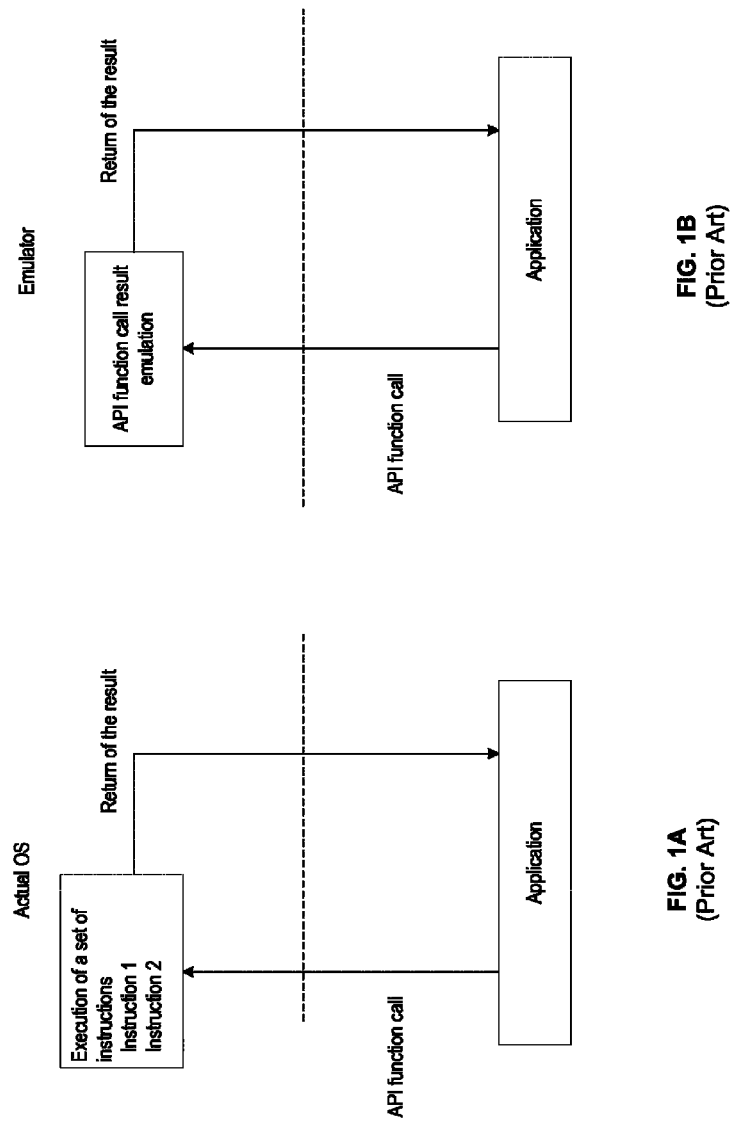

SYSTEM AND METHOD FOR COUNTERING DETECTION OF EMULATION BY MALWARE

CLAIM TO PRIORITY

This Application claims the benefit of Russian Federation Patent Application No. 2012141480 filed Sep. 28, 2012, the disclosure of which is incorporated by reference herein.

FIELD OF THE INVENTION

The invention relates generally to data processing systems and methods and, more particularly, to information security using system emulation techniques to detect the presence of malware.

BACKGROUND OF THE INVENTION

Malicious software applications (i.e., malware) can perform a wide range of harmful actions, such as theft of passwords and other confidential user data, accessing financial data to commit acts such as identity theft and other fraud, recruitment of the computer into a network of bots to perform denial-of-service (DoS) attacks or to send spam, blockage of system functionality for extortion purposes, among many other malevolent actions.

In order to infect a computer system and avoid detection by antivirus programs, malware is typically embedded into seemingly benign programs that appear to perform some useful function. During execution of such programs, the malware code is designed to be executed unbeknownst to the user. Massive effort has been expended to-date to combat malware. However, malware developers continuously find new ways to avoid computer security systems. Thus, a data security arms race persists in which malware and anti-malware developers are engaged in a repeating cycle of creating new "weapons" and defenses to counter those weapons.

Computer software is a complex set of instructions involving transfers to different execution environments, system calls, cycles, etc. It should be noted that the complexity of executable files is constantly increasing, which is attributable to the growing popularity of high-level programming languages and to the increasing complexity of computer equipment and operating systems. This is true for both trusted and malicious applications.

One of the techniques employed to evaluate a potentially malicious program is emulation of the execution of the program by the antivirus application, which permits the antivirus application to observe and analyze the program's behavior. Emulation involves software-based modeling, or imitation, of a computer's components—processor, memory and other system devices—by creating virtual representations of processor registries, memory, and the processor instructions set, and parts of the operating system. In this manner, the program instructions are executed not on the actual processor and related hardware, but on the virtual copy of these components in a protected, isolated, environment.

In order to counter the program code emulation, creators of malicious programs use various tricks, which can be based on the limitations related to the emulation process and to the realization of an emulator in antivirus solutions. One of these approaches involves adding to the program code a large number of instructions, which do not carry a malicious component but require time for emulation. Considering the fact that the time allocated for the emulation of a program code is limited to prevent user discontent (usually, this time can be a few seconds), the emulation process can stop before the execution of a really malicious code. One of the methods to fight such anti-emulation approach is described in the U.S. Pat. No. 7,603,713, the disclosure of which is incorporated by reference herein, the operation mode of which includes execution of a number of instructions on an actual processor, substantially accelerating the process of emulation of unknown applications in order to reach the malicious code itself. Another approach, disclosed in U.S. Pub. No. 2011/0225655, the disclosure of which is incorporated by reference herein, considers the option of defining an application as suspicious if it resists emulation. Such approach is based on the fact that a safe (legitimate) application usually displays a warning about the impossibility of execution in the emulator, while a malicious one comfortably completes the execution or suddenly changes the execution vector (logic).

Another anti-emulation method is based on the determination of the fact that the application is currently launched specifically in the emulator, and not in an actual operating system. It should be noted that an emulator creates a virtual representation of a processor, computer components and operating system (OS) only to a limited extent, with reduced capabilities. Given the complexity of operating systems, calls made by applications to the operating system's services via the application program interface (API), such as calls utilizing subsystem dynamic link libraries (DLLs), which in turn provide protected access to the functionality of the operating system's kernel via the ntdll.dll file, for example, are emulated by returning a fabricated (i.e., "emulated") result of that API call. In other words, during emulation, such system calls are not actually processed. Therefore, avoiding "full system" emulation provides a substantial savings in complexity and time of execution for the emulation, which is important to preserve a reasonably fast and responsive user experience. Indeed, a complete reproduction of all the capabilities of the processor or system API functions is impractical for several reasons—high labor costs for such design, the presence of undocumented functions, and dramatic loss of productivity during the operation of such emulator.

Exploiting this knowledge, creators of malicious programs can use the following techniques, which allow the program to discover the fact of execution in an emulated environment:
  Calling an undocumented or rarely used API function.
  Execution of a number of instructions by a central processor with subsequent check, for example, of a number of set flags. In case of insufficiently accurate emulation of processor commands, a number of flags can have values which differ from the ones that would be set in case of execution on an actual OS.
  Verification of the correctness of API function execution. Such verification can be very complicated and can include analysis of returned error codes in case of incorrect call or verification of the set processor flags.
  A memory scan for presence of specific bytes associated with API call processing is also a popular anti-emulation method.

The latter approach is widely used because it allows to constantly bypass the existing emulators, as it is impossible to implement a correct emulation of each API function for the above-described reasons.

In view of the above, a practical solution is needed for defeating anti-emulation techniques.

SUMMARY OF THE INVENTION

One aspect of the invention is directed to a method for investigating a presence of malicious code in an application program stored on a subject computer system. User-mode data processing and kernel-mode data processing are carried out, in which a plurality of system application program interfaces (APIs) provide access to user-mode and kernel-mode system functions. Instructions of the application program are emulated such that they are carried out sequentially in a first virtual execution environment that represents the user-mode data processing of the operating system. A system API call requesting execution of a user-mode system function is detected among the instructions of the application program. In response, the instructions of the user-mode system function called by the API are emulated according to a second emulation mode in which the instructions of the user-mode system function are carried out sequentially in a second virtual execution environment that represents the user-mode data processing of the operating system, including tracking certain processor and memory states affected by the instructions of the user-mode system function. Results of the emulating of the application program instructions according to the first emulation mode are analyzed for any presence of malicious code.

According to another aspect of the invention, a system for investigating a presence of malicious code in an application program includes computing hardware including at least one processor, memory, and an operating system that facilitates user-mode data processing and kernel-mode data processing, where a plurality of system application program interfaces (APIs) provide access to user-mode and kernel-mode system functions. The computing hardware includes instructions stored in a non-transitory medium that, when executed by the at least one processor, establish a standard emulator module, an instruction review module, a system call emulator module, and an analyzer module.

The standard emulator module emulates instructions of the application program according to a first emulation mode wherein the instructions of the application program are carried out sequentially in a first virtual execution environment that represents the user-mode data processing of the operating system. The instruction review module detects, among the instructions of the application program, a system API call requesting execution of a user-mode system function. The system call emulator module, in response to detecting the system API call, emulates instructions of the user-mode system function called by the API call according to a second emulation mode where the instructions of the user-mode system function are carried out sequentially in a second virtual execution environment that represents the user-mode data processing of the operating system, wherein certain processor and memory states affected by the instructions of the user-mode system function are represented. The analyzer module analyzes results of the emulating of the application program instructions according to the first emulation mode to detect any presence of malicious code in the application program.

BRIEF DESCRIPTION OF THE DRAWINGS

The invention may be more completely understood in consideration of the following detailed description of various embodiments of the invention in connection with the accompanying drawings, in which:

FIGS. 1A and 1B are diagrams illustrating an examples of the operation, respectively, of an actual operating system, such as a Windows® operating system, and an emulation environment using a conventional emulator, when processing API function calls.

Figure 1C:
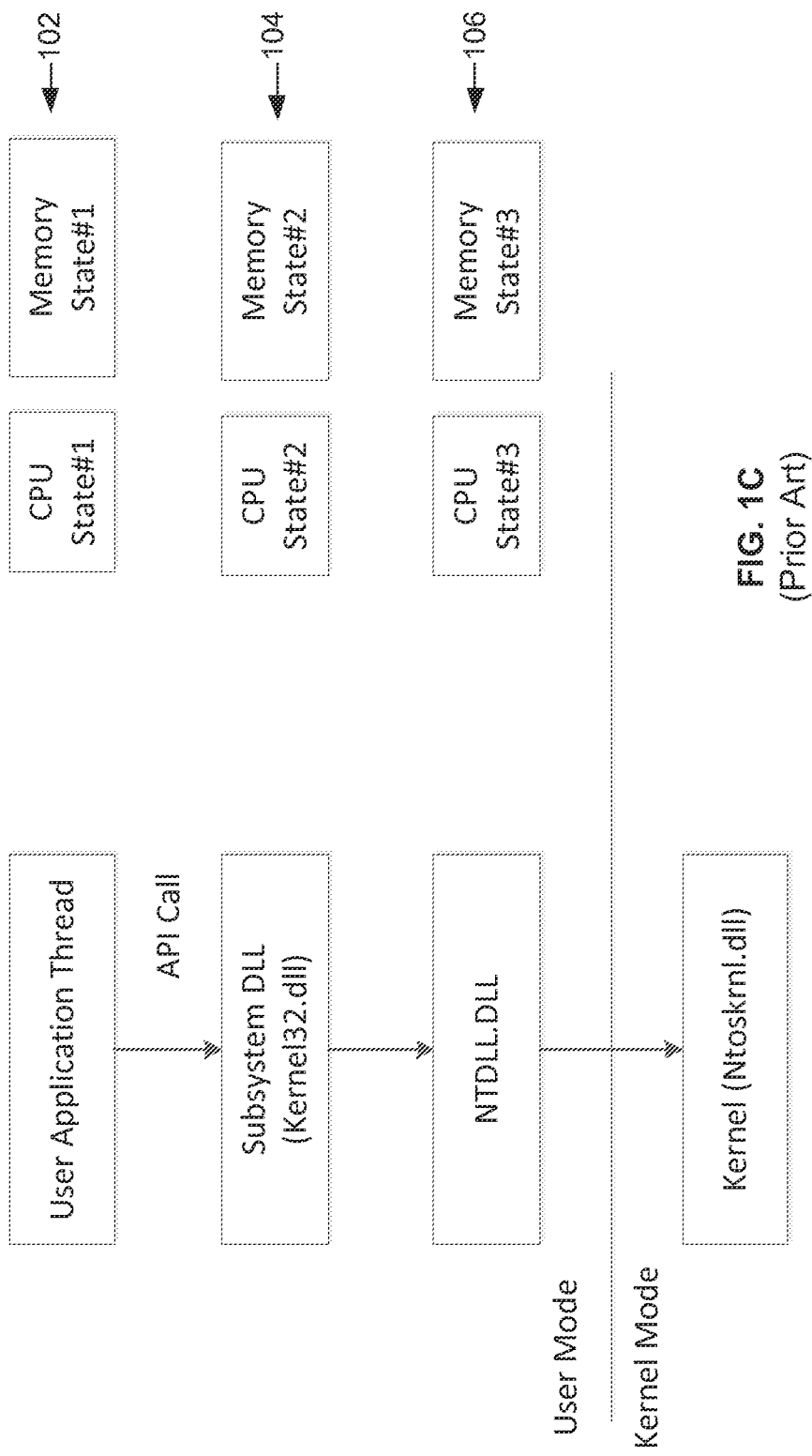
FIG. 1C is a diagram illustrating an example API call sequence in a Windows® operating system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIGS. 1A and 1B are diagrams illustrating an examples of the operation, respectively, of an actual operating system, such as a Windows® operating system, and an emulation environment using a conventional emulator, when processing API function calls. When, during the functioning of an application in an actual OS (FIG. 1A), there is an API function call by the application, the OS executes a set of instructions. The API function call results in the execution of a large number of instructions on the processor, after which the result of the performance of the called API function is sent back to the application. During the operation of the emulator (FIG. 1B), an API function call does not result in the same execution of the number of instructions as in an actual OS, but instead the application receives back an emulated result of the API function's performance. For example, in case of an attempt to create a file, the emulator will return the pointer to a fictional file, which is not actually created in the emulation. However, despite the overall result of the operation (for example, the return of the pointer to the file), the result of the performance of the called API function can differ between the actual OS and the emulator, which is due to the fact that true API function call execution can involve detectable changes of state of the processor's registers, memory addresses, etc., which will not be made if an the API function call processing is result-emulated. This difference can be used for anti-emulation techniques primarily by malicious programs.

FIG. 1C is a diagram illustrating an example API call sequence in a Windows® operating system. The user application thread makes an API call, which causes instructions from the subsystem DLL, such as those found in the kernel32.dll library (or libraries such as Advapi32.dll, User32.dll, and Gdi32.dll, for example), to be executed. Execution of the called functions, in turn, may call corresponding functions in the native API, ntdll.dll, which causes subsequent processing to switch from user mode to kernel mode to carry out the requested operation.

Within each operation in user mode, application threads have some visibility into certain CPU registers, process memory, and data structures such as TLS (thread local storage) and TEB (thread environment block). A simplified representation of this visibility is depicted as CPU States #1-3 and memory states #1-3, indicated with reference numerals 102, 104, and 106. An anti-emulation technique may look for the presence of certain values in these visible data stores at certain times, or in a certain order to confirm that the API function calls are actually being executed, from which the malware can conclude that it is not currently subjected to emulation, and may proceed with execution of malicious code.

Figure 1D:
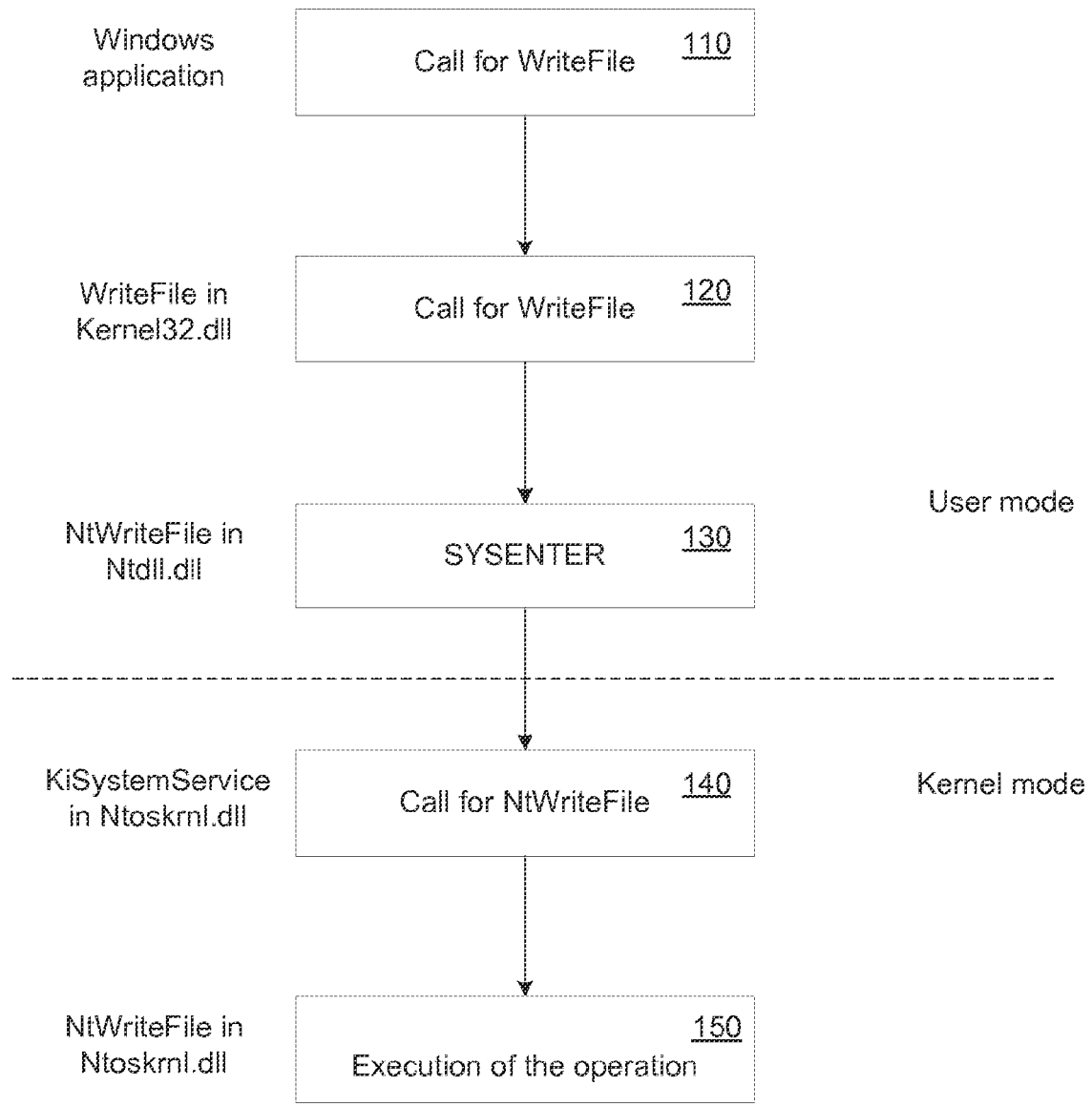
FIG. 1D illustrates an example of API function execution in Windows® operating environment.

FIG. 1D illustrates an example of API function execution in Windows® operating environment. WriteFile was selected as an API function example. At stage 110, a Windows application (for example, Microsoft Word or Notepad) attempts to write data into a file, by calling the corresponding Win32 API function WriteFile to Kernel32.dll. Then, at stage 120, there is a call for NtWriteFile to Ntdll.dll, which, in turn, results in a system interruption call at stage 130 and a search for a corresponding handler (which is done by the KiSystemService function in Ntoskrnl.dll) when NtWriteFile is called. It should be noted that this process happens in the user mode, but after the interruption call, the system switches to the kernel mode. At stage 140, NtWriteFile is called directly in Ntoskrnl.dll, and a write is made directly to a file at stage 150 (details related to file system driver operation are also hidden here). Based on this, it becomes clear that a call for even one API function results in a large number of operations in today's OSs, including a transfer of the application's execution from user to kernel mode. If these operations are considered from a point of view of execution of instructions in assembler language, it becomes clear that it is very difficult to correctly emulate an API function call, because of the need to take into account the status of all processor registers and the status of all internal structures of the OS.

Figure 1E:
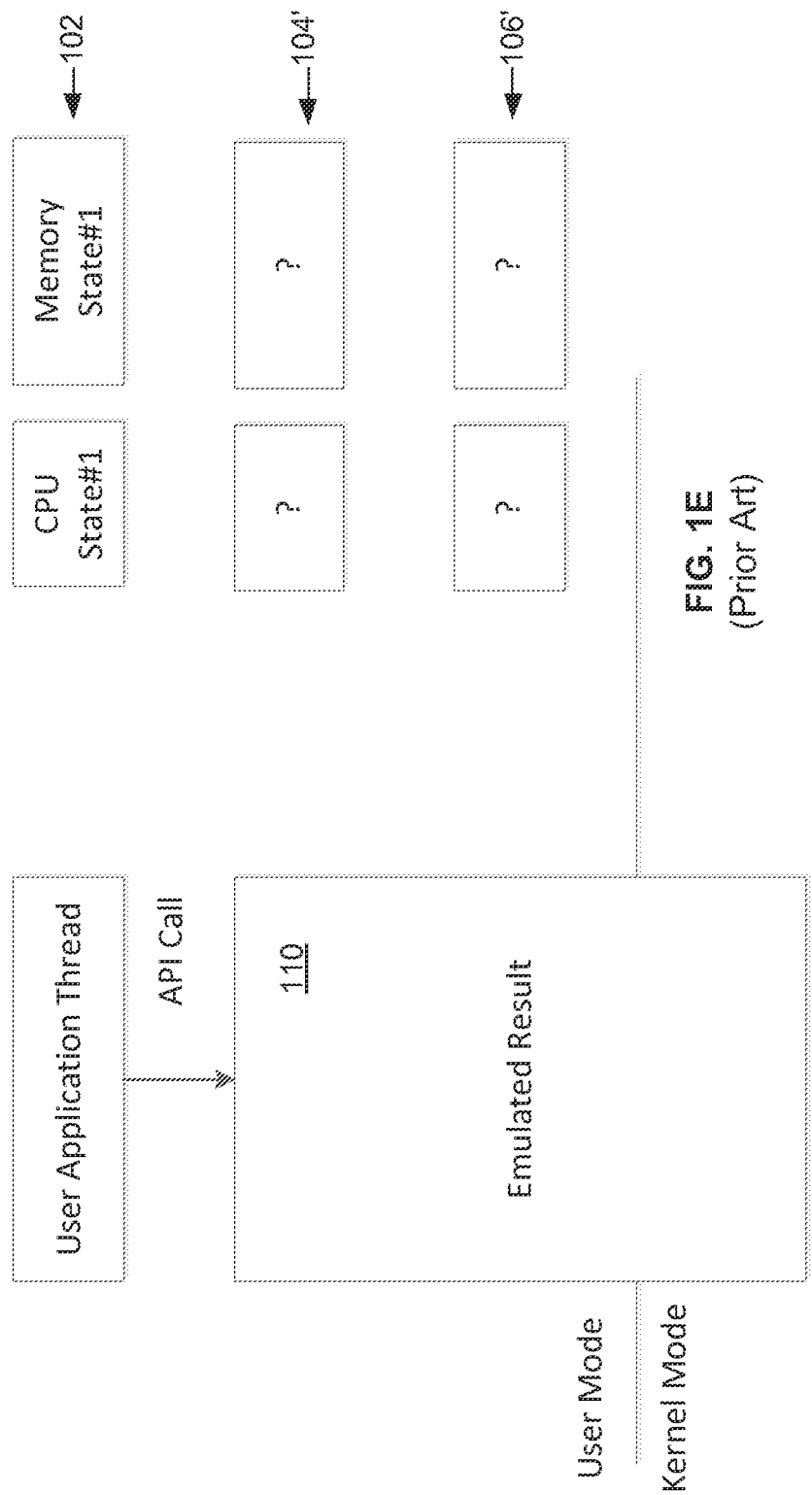
FIG. 1E is a diagram illustrating an example API call sequence emulated in a virtual execution environment.

FIG. 1E is a diagram illustrating an example API call sequence emulated in a virtual execution environment. In response to the API call made by the user application thread, the emulator returns an emulated result. The emulated result is not achieved by execution of the instructions from the subsystem DLL, the execution of the instructions in the native API, and the execution of the kernel code as would have been the case during actual execution by a complete Windows® operating system. Instead, emulated result 110 is returned which returns a fictional (albeit plausible) result based on the nature of the API call by the user application thread. Emulation avoidance tools that are monitoring CPU and memory states 102, 104, and 106 will note that, instead of expected states 104 and 106, there are different states 104' and 106'. This is indicative of emulation taking place.

Figure 2:
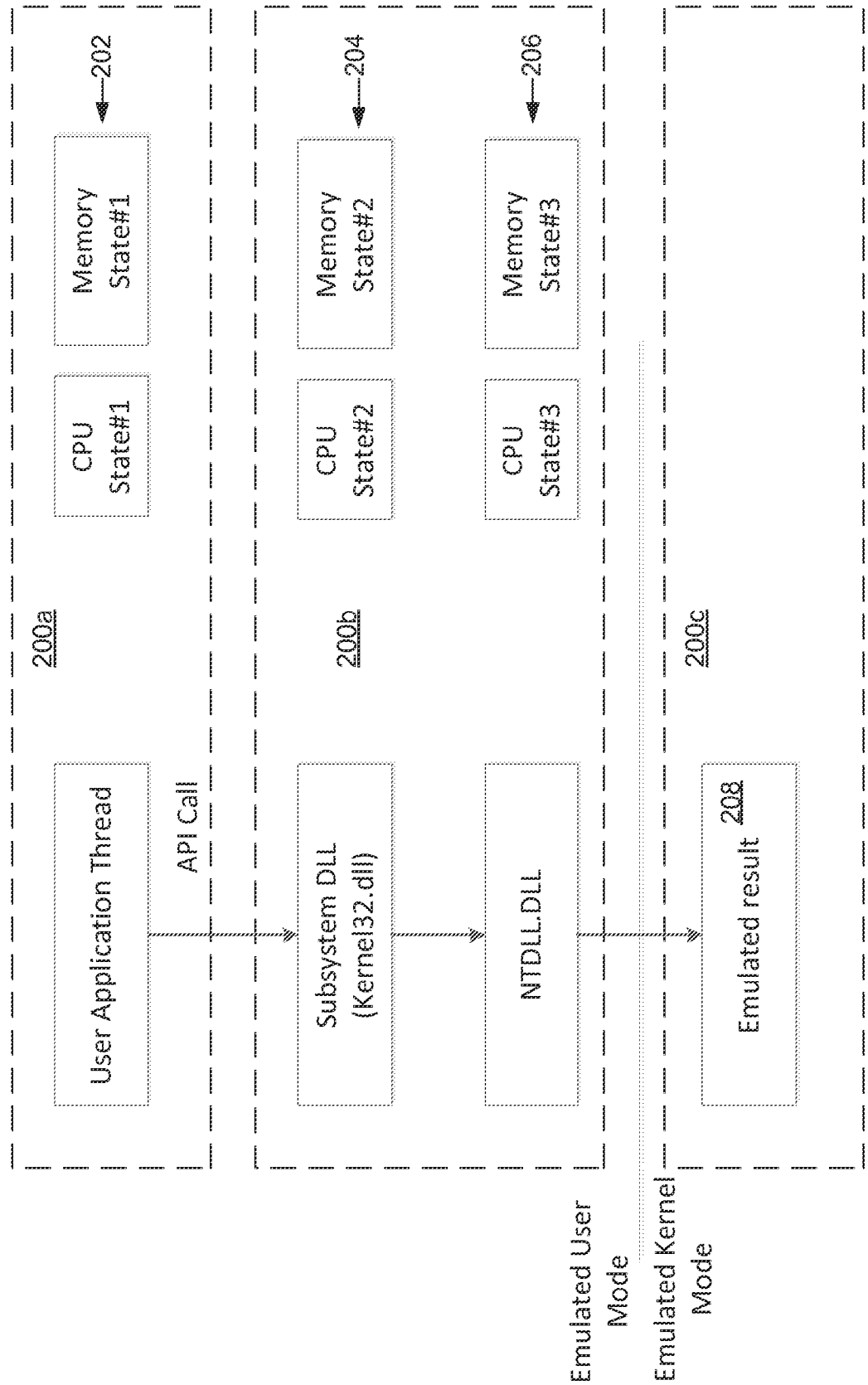
FIG. 2 illustrates an improved emulation technique according to one aspect of the invention.

FIG. 2 illustrates an improved emulation technique according to one aspect of the invention. In standard emulation mode 200a, the user application thread is executed instruction-by-instruction in emulated user mode. CPU State #1 and Memory State #1, indicated with reference numeral 202, are observable. When the user application thread makes the API call, the called functions in the subsystem DLL and native API NTDLL.DLL are executed in system call emulation mode 200b, also in emulated user mode. This provides CPU and memory state information 204 and 206, which matches state information 104 and 106. In one embodiment, emulation modes 200a and 200b share the same virtual execution environment (e.g., common emulated memory space, processor registers, certain emulated operating system data structures, etc.). This provides an appearance of a single system in which the application process is executing.

When the execution must switch from emulated user mode to emulated kernel mode, the called kernel-mode functionality is emulated in abbreviated emulation mode 200c, wherein the kernel code is not executed. Instead, an emulated result is returned at 208. In a related embodiment, the abbreviated emulation mode 200c is carried out as a subset of standard emulation mode 200a. Since, in kernel mode the CPU and memory states are not visible to user-level applications, the fact that the kernel mode emulation is fictional is not evident to the user application. Accordingly, malware having emulation avoidance technology that relies on monitoring for indicia of non-execution of the user-level API function calls, is unable to detect the emulation environment and proceeds to reveal its malicious code, which can be detected from conventional heuristic analysis of the application's behavior.

Figure 3:
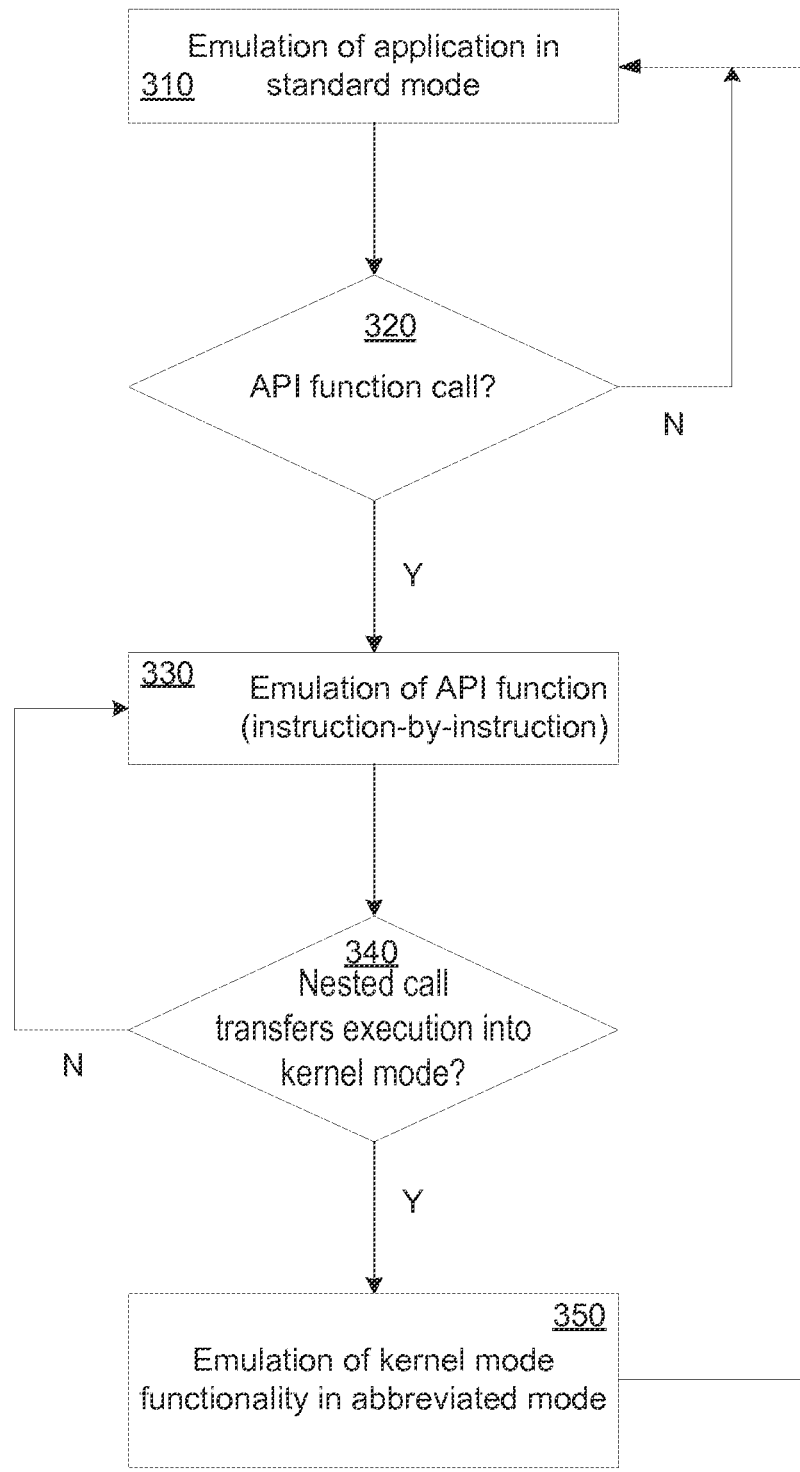
FIG. 3 illustrates in greater detail a process for emulating API function calls according to one aspect of the invention.

FIG. 3 illustrates in greater detail a process for emulating API function calls according to one aspect of the invention. At block 310, a standard emulation of an application takes place, such as for example, in the case of Notepad application emulation (the assembly code for which is listed in Table 1 as follows):

TABLE 1

| | | |
|---|---|---|
| 004937EF /$ 8BFF | MOV EDI,EDI | |
| 004937F1 \|. 55 | PUSH EBP | |
| 004937F2 \|. 8BEC | MOV EBP,ESP | |
| 004937F4 \|. 83EC 30 | SUB ESP,30 | |
| 004937F7 \|. 6A 2C | PUSH 2C | ; /n = 2C (44.) |
| 004937F9 \|. 8D45 D4 | LEA EAX,DWORD PTR SS:[EBP-2C] | ; \| |
| 004937FC \|. 6A 00 | PUSH 0 | ; \|c = 00 |
| 004937FE \|. 50 | PUSH EAX | ; \|s |
| 004937FF \|. E8 B1DDFFFF | CALL <JMP.&msvcrt.memset | ; \memset |
| 00493804 \|. 83C4 0C | ADD ESP,0C | |
| 00493807 \|. 68 017F0000 | PUSH 7F01 | ; /RsrcName = IDC_BEAM |
| 0049380C \|. 6A 00 | PUSH 0 | ; \|hInst = NULL |
| 0049380E \|. C745 D0 300000> | MOV DWORD PTR SS:[EBP-30],30 | ; \| |
| 00493815 \|. FF15 D8114900 | CALL DWORD PTR DS:[<&USER32.LoadCursorW>> | ; \LoadCursorW |
| 0049381B \|. 6A 02 | PUSH 2 | ; /RsrcName = 2. |
| 0049381D \|. 56 | PUSH ESI | ; \|hInst |
| 0049381E \|. 8945 EC | MOV DWORD PTR SS:[EBP-14],EAX | ; \| |
| 00493821 \|. FF15 88124900 | CALL DWORD PTR DS:[<&USER32.LoadIconW>] | ; \LoadIconW |

TABLE 1-continued

| | | |
|---|---|---|
| 00493827 I. 6A 00 | PUSH 0 | |
| 00493829 I. 6A 10 | PUSH 10 | ; \|Height = 10 (16.) |
| 0049382B I. 6A 10 | PUSH 10 | ; \|Width = 10 (16.) |
| 0049382D I. 6A 01 | PUSH 1 | ; \|Type = IMAGE_ICON |
| 0049382F I. 6A 02 | PUSH 2 | ; \|ResourceName = 2 |
| 00493831 I. 56 | PUSH ESI | ; \|hInst |
| 00493832 I. 8945 E8 | MOV DWORD PTR SS:[EBP-18],EAX | ; \| |
| 00493835 I. FF15 D4114900 | CALL DWORD PTR DS:[<&USER32.LoadImageW>] | ; \LoadImageW |

Such instructions as MOV, PUSH, SUB, LEA, etc., will be emulated "as is," i.e., by emulating assembler instructions using a virtual processor in the emulator. As soon as an API function call takes place, (which is determined at block 320), such as the instruction shown in Table 2:

TABLE 2

| | | |
|---|---|---|
| 00493815 I. FF15 D8114900 | CALL DWORD PTR DS:[<&USER32.LoadCursorW>> | ; \LoadCursorW |

The emulation of such call will happen following machine instructions (block 330) taking into account all associated API function calls. When a switch to kernel mode is performed upon execution of an API function, which is identified at block 340, the emulation switches to abbreviated mode at block 350 for emulating the kernel mode instructions, i.e. further calls will not be processed sequentially following each instruction, but only a result of the function call will be returned. Upon the return from the function calls to the emulated application under investigation, the process returns from block 350 to block 310 for further sequential emulation of the application under investigation in standard mode.

Figure 4:
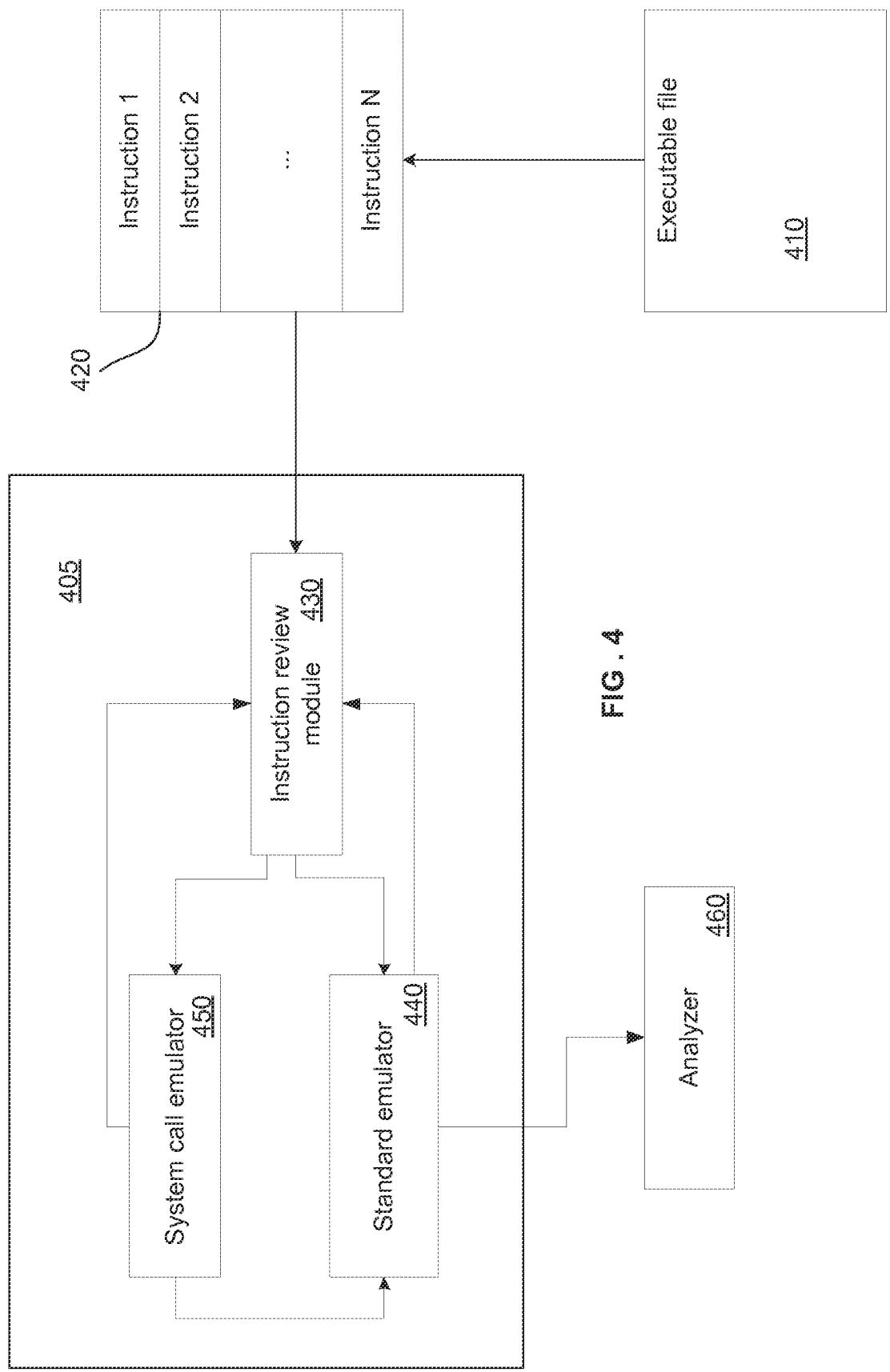
FIG. 4 is a block diagram illustrating a system implemented by a computer system according to one embodiment of the invention.

FIG. 4 is a block diagram illustrating a system implemented by a computer system according to one embodiment of the invention. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

As depicted in this example, a user's computer has an unknown executable file 410, which should be emulated to determine its malicious potential. It should be noted that an executable file should mean not only executable files in PE or ELF format, but also other files containing various codes, such as .class or .jar files (for execution in Java virtual machine), various scripting language files, such as .vbs, and many others.

The file 410 itself contains instructions 420, sequential emulation of which reproduces the execution of the file. Emulation is performed by emulator module 405, which includes instruction review module 430, standard emulator module 440, and system call emulator module 450. Note that in this context, sequential emulation also means execution of all branching operations, both conditional and unconditional, as well as calls for various functions within the executable file 410. With sequential emulation, each instruction 420 is sent to the input of the instruction review module 430, which determines whether an instruction is a call for a system API function, and, if yes, sends the instruction to the system calls emulator 450. If not, the instruction is passed to standard emulator 440 for execution.

In some embodiments, an API function call instruction can be emulated in the same manner as it would be done by conventional emulation—i.e., in abbreviated fashion where only a fictitious result of the API function call would be returned. Whether An API function call is processed in conventional (i.e., abbreviated) fashion, or passed to system calls emulator 450 can be decided by additional decision logic in instruction review module 430.

It should be noted that the system calls emulator 450 performs emulation of API functions following machine instructions, and tracking the affected states of the processor and memory until the switch to the kernel mode. Upon switching to kernel mode, the code emulation control is transferred to standard emulator 440, in which the emulation of kernel mode code entails generating and returning a fictitious but relevant, i.e., plausible, result from the execution of the kernel-level code. This abbreviated type of emulation utilizes logic to determine the type of fictitious result to return in response to various types of function calls; actual instruction-by-instruction sequential virtual processing of the API functions themselves, is not performed by standard emulator 440.

Analyzer 460 monitors the sequence of instructions carried out by standard emulator 440 and applies any of a variety of known techniques to ascertain whether the file 410 contains malicious code. Examples of known techniques for determining the presence of malicious code include statistical techniques, heuristic analysis, artificial neural networks, expert systems, and the like. Any suitable analysis/detection technique, or any combination thereof, whether known or later developed, are contemplated for use with embodiments of this invention. In a related embodiment, analyzer 460 also monitors the operation of system call emulator 450. This option may be relevant for cases where certain data is passed to the system API being called, and the system API operations are utilized as part of performing the malicious functionality of the malware.

Instruction review module 430, standard emulator 440, system calls emulator 450, and analyzer 460 are implemented as modules. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more general purpose computers (such as the one described in greater detail below) that execute an operating system, system programs, and application programs, while also implementing the module using multitasking, multithreading, distributed (e.g., cloud) processing, or other such techniques. Accordingly, each module can be realized in a variety of suitable configurations, and should not be limited to any particular implementation exemplified herein. In one particular embodiment, these modules are implemented as parts of a virtual execution environment, which itself runs as a user application. In a related embodiment, the virtual execution environment is a sandbox that is isolated from memory space and other resources of the computer system, so that any malware instructions being emulated are unable to do any actual harm.

Figure 5:
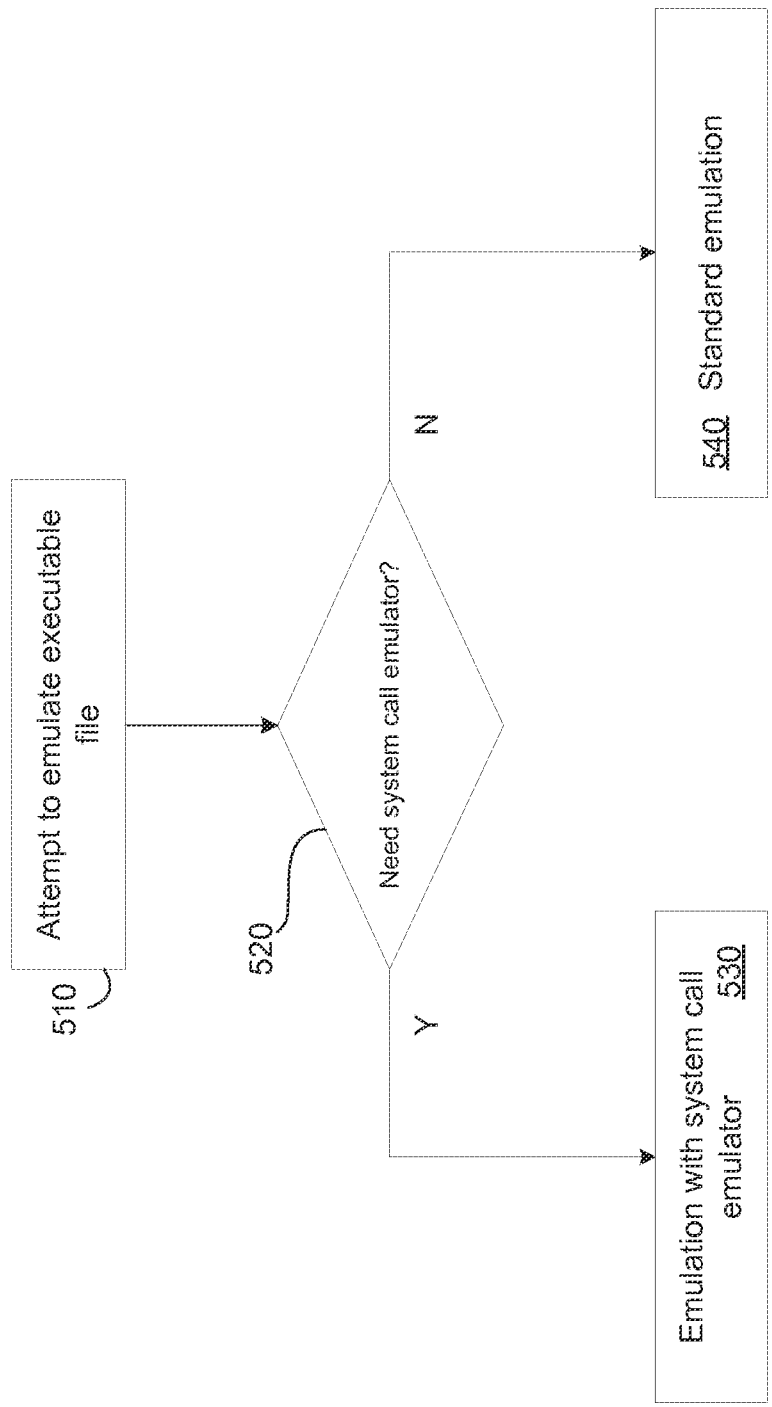
FIG. 5 illustrates a basic decision process performed by the instruction review module depicted in FIG. 4 according to one embodiment.

FIG. 5 illustrates a basic decision process performed by instruction review module 430 according to one embodiment. At block 510, an attempt is made to emulate an executable file 410 on a user computer. In response thereto, at block 520, instruction review module 430 determines whether emulation of system API functions needs to be performed.

According to various embodiments, example requirements for more selective emulation of system functions include:

The initial emulation ended very quickly and without notifying the user. This usually means that the application determines the fact of emulated operation, without notifying the user, which is generally done by dangerous programs.

A deeper emulation of the executable file 410 is needed. This happens if the executable file 410 was not encountered earlier, which means the absence of information on the unknown file on the part of the antivirus application in which the emulator is working (i.e. not classified and is not contained in the antivirus application's databases as a malicious or a safe application).

The analyzer 460 has detected anti-emulation methods. Examples include API calls with knowingly incorrect parameters with subsequent verification of the error status (code); verification of volatile registries after the API call; scans of system module content; attempts to detect a debugger in the system; and calls for standard methods for detecting execution on a virtual machine (e.g., Red-Pill).

Detection of auto-extraction or auto-protection (packers and protectors).

According to one set of embodiments, if at least one of such requirements is met, this results in the involvement, at block 530, of a system calls emulator 450 for emulating API functions by carrying out machine instructions, as exemplified in FIG. 4. Otherwise, block 540 selects the standard emulator 440. Using such a selective approach allows for a more versatile solution to the emulation process within an antivirus application, without causing unduly the user's discontent due to additional loads because of the need to emulate every single API function call using the sequential following of machine instructions approach of the systems call emulator 450.

In a related embodiment, the emulation time is not limited by rigid time frames; for example, it can last dozens of seconds or even several minutes and longer, as may be required to complete the operation of the system calls emulator.

In various related embodiments, examples of use of the method and systems of the present invention include:

Emulation of a potential malicious item within the context of the user's operating environment with all its libraries and interpreters, e.g., multi-component malicious items.

Emulation of the operation of interpreters and JIT compilers (.NET and Java, perl) installed on the user's equipment can be carried out.

Emulation of batch and control files (bat, powershell, reg) can be carried out. Everything that may be executed on the user's computer, and everything in which malicious code may be incorporated can now be checked using a system calls emulator.

Figure 6:
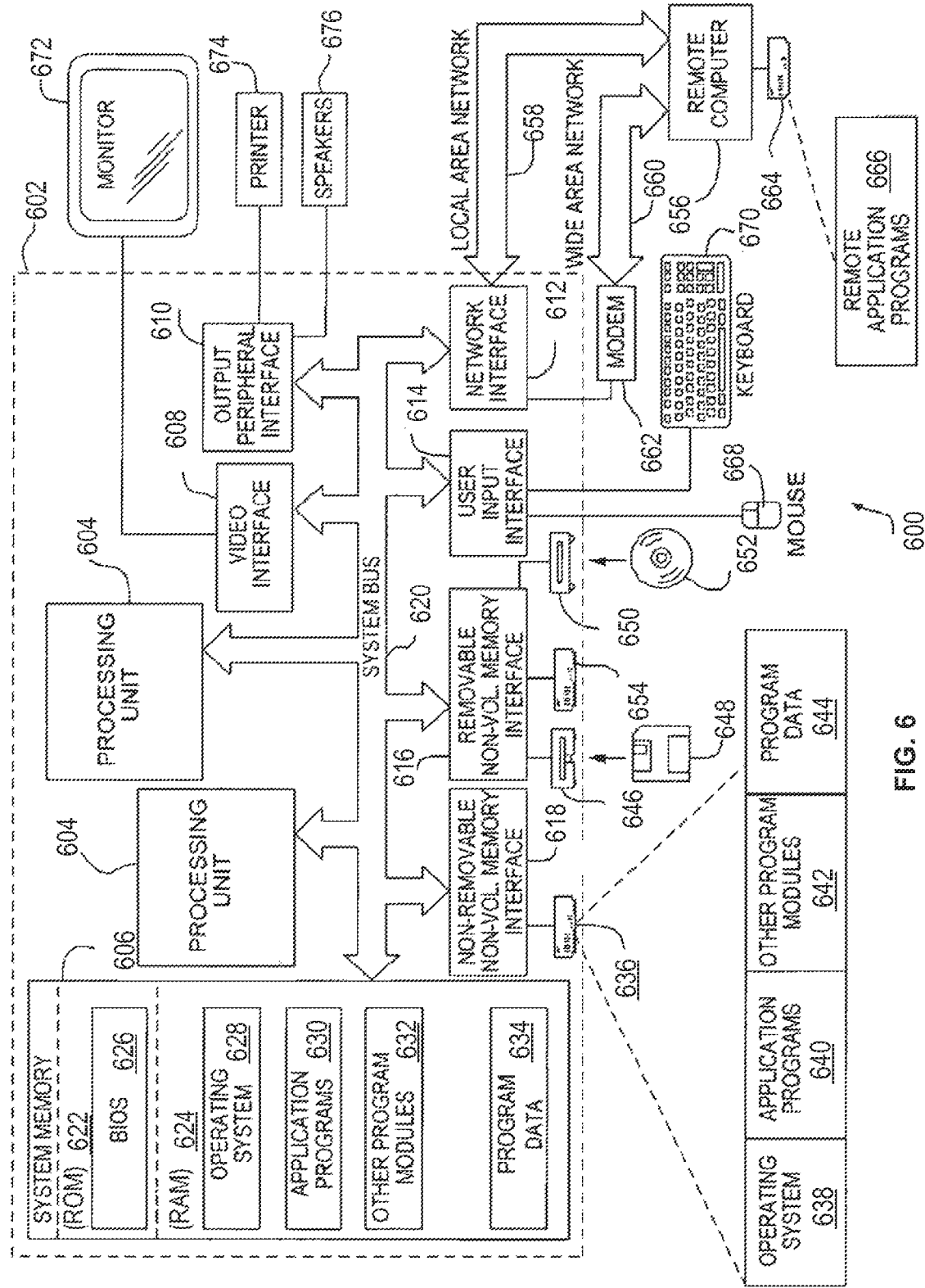
FIG. 6 is a diagram illustrating in greater detail a computer system on which aspects of the invention as described herein may be implemented according to various embodiments.

FIG. 6 is a diagram illustrating in greater detail a computer system 600 on which aspects of the invention as described herein may be implemented according to various embodiments. The computer system 600 may include a computing device such as a personal computer 602. The personal computer 602 includes one or more processing units 604, a system memory 606, a video interface 608, an output peripheral interface 610, a network interface 612, a user input interface 614, removable 616 and non-removable 618 memory interfaces and a system bus or high-speed communications channel 620 coupling the various components. In various embodiments, the processing units 604 may have multiple logical cores that are able to process information stored on computer readable media such as the system memory 606 or memory attached to the removable 616 and non-removable 618 memory interfaces 618. The computer 602 system memory 606 may include non-volatile memory such as Read Only Memory (ROM) 622 or volatile memory such as Random Access Memory (RAM) 624. The ROM 622 may include a basic input/output system (BIOS) 626 to help communicate with the other portion of the computer 602. The RAM 624 may store portions of various software applications such as the operating system 628, application programs 630 and other program modules 632. Further, the RAM 624 may store other information such as program or application data 634. In various embodiments, the RAM 624 stores information that requires low-latencies and efficient access, such as programs and data being manipulated or operated on. In various embodiments RAM 624 comprises Double Data Rate (DDR) memory, Error Correcting memory (ECC) or other memory technologies with varying latencies and configurations such as RAMBUS or DDR2 and DDR3. In this way, in various embodiments, the system memory 606 may store the input data store, access credential data store, operating memory data store, instruction set data store, analysis result data store and the operating memory data store. Further, in various embodiments, the processing units 604 may be configured to execute instructions that limit access to the aforementioned data stores by requiring access credential before access to the information is granted.

The removable 616 and non-removable 618 memory interfaces may couple the computer 602 to disk drives 636 such as SSD or rotational disk drives. These disk drives 636 may provide further storage for various software applications such as the operating system 638, application programs 640 and other program modules 642. Further, the disk drives 636 may store other information such as program or application data 644. In various embodiments, the disk drives 636 store information that doesn't require the same low-latencies as in other storage mediums. Further, the operating system 638, application program 640 data, program modules 642 and program or application data 644 may be the same information as that stored in the RAM 624 in various embodiments mentioned above or it may be different data potentially derivative of the RAM 624 stored data.

Further, the removable non-volatile memory interface 616 may couple the computer 602 to magnetic portable disk drives 646 that utilize magnetic media such as the floppy disk 648, Iomega® Zip or Jazz, or optical disk drives 650 that utilize optical media 652 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 602 may utilize the network interface 612 to communicate with one or more remote computers 656 over a local area network (LAN) 658 or a wide area network (WAN) 660. The network interface 612 may utilize a Network Interface Card (NIC) or other interface such as a modem 662 to enable communication. The modem 662 may enable communication over telephone lines, coaxial, fiber optic, powerline, or wirelessly. The remote computer 656 may contain a similar hardware and software configuration or may have a memory 664 that contains remote application programs 666 that may provide additional computer readable instructions to the computer 602. In various embodiments, the remote computer memory 664 can be utilized to store information such as identified file information that may be later downloaded to local system memory 606. Further, in various embodiments the remote computer 656 may be an application server, an administrative server, client computers, or a network appliance.

A user may enter information to the computer 602 using input devices connected to the user input interface 614 such as a mouse 668 and keyboard 670. Additionally, the input device may be a trackpad, fingerprint scanner, joystick, barcode scanner, media scanner or the like. The video interface 608 may provide visual information to a display such as a monitor 672. The video interface 608 may be an embedded interface or it may be a discrete interface. Further, the computer may utilize a plurality of video interfaces 608, network interfaces 612 and removable 616 and non-removable 618 interfaces in order to increase the flexibility in operation of the computer 602. Further, various embodiments utilize several monitors 672 and several video interfaces 608 to vary the performance and capabilities of the computer 602. Other computer interfaces may be included in computer 602 such as the output peripheral interface 610. This interface may be coupled to a printer 674 or speakers 676 or other peripherals to provide additional functionality to the computer 602.

Various alternative configurations and implementations of the computer 602 are within the spirit of the invention. These variations may include, without limitation, additional interfaces coupled to the system bus 620 such as universal serial bus (USB), printer port, game port, PCI bus, PCI Express or integrations of the various components described above into chipset components such as the northbridge or southbridge. For example, in various embodiments, the processing unit 604 may include an embedded memory controller (not shown) to enable more efficient transfer of data from the system memory 606 than the system bus 620 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automated computer-implemented method for investigating a presence of malicious code in an application program stored on a subject computer system, the subject computer system including a processor, memory, and an operating system that facilitates user-mode data processing and kernel-mode data processing wherein a plurality of system application program interfaces (APIs) provide access to user-mode and kernel-mode system functions, the method comprising:
    emulating instructions of the application program according to a first emulation mode wherein the instructions of the application program are carried out sequentially in a first virtual execution environment that represents the user-mode data processing of the operating system;
    detecting, among the instructions of the application program, a system API call requesting execution of a user-mode system function;
    in response to detecting the system API call, emulating instructions of the user-mode system function called by the API call according to a second emulation mode wherein the instructions of the user-mode system function are carried out sequentially in a second virtual execution environment that represents the user-mode data processing of the operating system, including tracking certain processor and memory states affected by the instructions of the user-mode system function; and
    analyzing results of the emulating of the application program instructions according to the first emulation mode for any presence of malicious code.

2. The method of claim 1, further comprising:
    prior to emulating each individual instruction of the application program according to the first emulation or the second mode, examining that instruction for a presence of a system API call, wherein a result of the examining includes either the detecting of the system API call, or a determination of no system API call resulting from execution of that instruction.

3. The method of claim 1, further comprising:
    detecting, among the instructions of the system API call, a system call for requesting execution of a kernel-mode function;
    in response to detecting the system call for requesting execution of the kernel-mode function, emulating the kernel-mode function according to a first emulation mode wherein a fictitious result of the kernel-mode function is returned.

4. The method of claim 1, wherein in emulating the instructions of the system API call according to the second mode, a time of emulation is unrestricted.

5. The method of claim 1, wherein emulating the instructions of the system API call according to the second mode includes execution of all conditional and unconditional branching operations, and function calls taking place within the instructions of the application program.

6. The method of claim 1, wherein in emulating the instructions of the application program and in emulating the instructions of the system API call, the first virtual execution environment and the second virtual execution environment are a common virtual execution environment having shared virtual data storage space.

7. The method of claim 1, further comprising:
in response to each detection of a system API call, and prior to emulating instructions of the user-mode system function, determining whether the user-mode system function called by the API call is to be emulated according to the first emulation mode or the second emulation mode.

8. The method of claim 7, wherein the determining whether the user-mode system function called by the API call is to be emulated according to the first emulation mode or the second emulation mode is based on a duration of emulation of the application program.

9. The method of claim 7, wherein the determining whether the user-mode system function called by the API call is to be emulated according to the first emulation mode or the second emulation mode is based on whether the application program is unlisted in a whitelist database accessible to the subject computer system.

10. The method of claim 7, wherein the determining whether the user-mode system function called by the API call is to be emulated according to the first emulation mode or the second emulation mode is based on a detection of anti-emulation operations during the emulation of the application program instructions in the first emulation mode.

11. The method of claim 7, wherein the determining whether the user-mode system function called by the API call is to be emulated according to the first emulation mode or the second emulation mode is based on a detection of auto-extraction or auto-protection mechanisms during the emulation of the application program instructions in the first emulation mode.

12. A system for investigating a presence of malicious code in an application program, the system comprising:
computing hardware including at least one processor, memory, and an operating system that facilitates user-mode data processing and kernel-mode data processing wherein a plurality of system application program interfaces (APIs) provide access to user-mode and kernel-mode system functions, the computing hardware including instructions stored in a non-transitory medium that, when executed by the at least one processor, establish:
a first emulator module that emulates instructions of the application program according to a first emulation mode wherein the instructions of the application program are carried out sequentially in a first virtual execution environment that represents the user-mode data processing of the operating system;
an instruction review module that detects, among the instructions of the application program, a system API call requesting execution of a user-mode system function;
a second emulator module that, in response to detecting the system API call, emulates instructions of the user-mode system function called by the API call according to a second emulation mode wherein the instructions of the user-mode system function are carried out sequentially in a second virtual execution environment that represents the user-mode data processing of the operating system, wherein certain processor and memory states affected by the instructions of the user-mode system function are represented; and
an analyzer module that analyzes results of the emulating of the application program instructions according to the first emulation mode to detect any presence of malicious code in the application program.

13. The system of claim 12, wherein the second emulator module is further configured to:
detect, among the instructions of the system API call, a system call for requesting execution of a kernel-mode function;
in response to detecting the system call for requesting execution of the kernel-mode function, pass control to the first emulator module to emulate the kernel-mode function according to a first emulation mode wherein a fictitious result of the kernel-mode function is returned.

14. The system of claim 12, wherein the second emulator module is further configured to emulate the instructions of the system API call according to the second mode, in which a time of emulation is unrestricted.

15. The system of claim 12, wherein the second emulator module is further configured to emulate the instructions of the system API call according to the second mode in which all conditional and unconditional branching operations, and function calls taking place within the instructions of the application program, are executed.

16. The system of claim 12, wherein the first virtual execution environment and the second virtual execution environment are a common virtual execution environment having shared virtual data storage space.

17. The system of claim 12, wherein the instruction review module is further configured to:
determine whether the user-mode system function called by the API call is to be emulated according to the first emulation mode or the second emulation mode in response to each detection of a system API call, and prior to emulation of instructions of the user-mode system function.

18. The system of claim 17, wherein the instruction review module is further configured to determine whether the user-mode system function called by the API call is to be emulated according to the first emulation mode or the second emulation mode, based on a duration of emulation of the application program.

19. The system of claim 17, wherein the instruction review module is further configured to determine whether the user-mode system function called by the API call is to be emulated according to the first emulation mode or the second emulation mode, based on whether the application program is unlisted in a whitelist database accessible to the subject computer system.

20. The system of claim 17, wherein the instruction review module is further configured to determine whether the user-mode system function called by the API call is to be emulated according to the first emulation mode or the second emulation mode, based on a detection of anti-emulation operations during the emulation of the application program instructions in the first emulation mode.

21. The system of claim 17, wherein the instruction review module is further configured to determine whether the user-mode system function called by the API call is to be emulated according to the first emulation mode or the second emulation mode, based on a detection of auto-extraction or auto-protection mechanisms during the emulation of the application program instructions in the first emulation mode.

22. A system for investigating a presence of malicious code in an application program, the system comprising:
- computing hardware including at least one processor, memory, and an operating system that facilitates user-mode data processing and kernel-mode data processing wherein a plurality of system application program interfaces (APIs) provide access to user-mode and kernel-mode system functions, the computing hardware including instructions stored in a non-transitory medium that, when executed by the at least one processor, establish:
- means for emulating instructions of the application program according to a first emulation mode wherein the instructions of the application program are carried out sequentially in a first virtual execution environment that represents the user-mode data processing of the operating system;
- means for detecting, among the instructions of the application program, a system API call requesting execution of a user-mode system function;
- means for emulating instructions of the user-mode system function called by the API call according to a second emulation mode wherein the instructions of the user-mode system function are carried out sequentially in a second virtual execution environment that represents the user-mode data processing of the operating system, wherein certain processor and memory states affected by the instructions of the user-mode system function are represented, said means for emulating instructions initiate operation in response to detecting the system API call; and
- means for analyzing results of the emulating of the application program instructions according to the first emulation mode to detect any presence of malicious code in the application program.

* * * * *